(12) United States Patent
Hauler

(10) Patent No.: US 9,862,243 B2
(45) Date of Patent: Jan. 9, 2018

(54) REMOVABLE TRAILER TOW HITCH

(71) Applicant: K-12, LLC, Southfield, MI (US)

(72) Inventor: John Hauler, Grosse Pointe Woods, MI (US)

(73) Assignee: K-12, LLC, Southfield, MI (US)

( * ) Notice: Subject to any disclaimer, the term of this patent is extended or adjusted under 35 U.S.C. 154(b) by 0 days.

(21) Appl. No.: 15/128,628

(22) PCT Filed: Mar. 18, 2015

(86) PCT No.: PCT/US2015/021158
§ 371 (c)(1),
(2) Date: Sep. 23, 2016

(87) PCT Pub. No.: WO2015/148197
PCT Pub. Date: Oct. 1, 2015

(65) Prior Publication Data
US 2017/0174025 A1    Jun. 22, 2017

Related U.S. Application Data

(60) Provisional application No. 61/969,353, filed on Mar. 24, 2014.

(51) Int. Cl.
*B60D 1/52* (2006.01)
*B60D 1/56* (2006.01)
*B60D 1/06* (2006.01)
*B60D 1/00* (2006.01)

(52) U.S. Cl.
CPC ............... *B60D 1/52* (2013.01); *B60D 1/065* (2013.01); *B60D 1/565* (2013.01); *B60D 2001/001* (2013.01)

(58) Field of Classification Search
CPC .......... B60D 1/52; B60D 1/065; B60D 1/565; B60D 2001/001
See application file for complete search history.

(56) References Cited

U.S. PATENT DOCUMENTS

| | | |
|---|---|---|
| 2,347,081 A | 4/1944 | Douglas |
| 2,432,249 A | 12/1947 | Pearson |
| 2,542,907 A | 2/1951 | Dayton et al. |
| 2,549,941 A | 4/1951 | Smith |
| 2,575,171 A | 11/1951 | Hulse |

(Continued)

OTHER PUBLICATIONS

U.S. Patent Office, Non-Final Office Action, U.S. Appl. No. 14/664,376, filed Mar. 20, 2015, dated Jun. 19, 2015, 7 pages.

(Continued)

*Primary Examiner* — Kevin Hurley
*Assistant Examiner* — Marlon A Arce
(74) *Attorney, Agent, or Firm* — Brooks Kushman P.C.

(57) ABSTRACT

A removable trailer tow hitch is provided. The removable trailer tow hitch includes a tongue having a first clamping portion located at one end and is configured to receive a towing connection at the other end. The first clamping portion is configured to engage a vehicle bumper. A lever arm having a second clamping portion is pivotally attached to the tongue. The second clamping portion is configured to removably secure the trailer tow hitch to a vehicle when the lever arm is moved from an open position to a closed position. The second clamping portion is configured to engage a vehicle frame.

20 Claims, 4 Drawing Sheets

(56) References Cited

U.S. PATENT DOCUMENTS

| | | | |
|---|---|---|---|
| 2,818,277 | A | 12/1957 | McElhoe |
| 3,011,800 | A | 12/1961 | Mitsuyasu |
| 3,376,051 | A | 4/1968 | Bacher |
| 3,560,024 | A | 2/1971 | Abromavage et al. |
| 4,157,189 | A | 6/1979 | Poley |
| 4,277,081 | A | 7/1981 | Stoutenburg |
| 4,484,759 | A * | 11/1984 | Zwick .................. B60D 1/56 |
| | | | 280/416.1 |
| 4,610,458 | A | 9/1986 | Garnham |
| 4,697,818 | A | 10/1987 | Moore |
| 4,867,469 | A | 9/1989 | Freeman |
| 4,883,285 | A | 11/1989 | Hohrman |
| 5,052,604 | A | 10/1991 | Tourangeau |
| 5,350,029 | A | 9/1994 | Figueroa |
| 6,367,834 | B1 | 4/2002 | Brown |
| 6,419,259 | B1 | 7/2002 | Brown et al. |
| 6,505,848 | B1 | 1/2003 | Brown et al. |
| 6,523,849 | B1 | 2/2003 | Brown et al. |
| 6,523,850 | B1 | 2/2003 | Brown et al. |
| 6,616,169 | B1 | 9/2003 | Brown et al. |
| 6,811,176 | B2 | 11/2004 | Brown et al. |
| 7,422,082 | B2 | 9/2008 | Reffitt |
| 8,376,387 | B2 | 2/2013 | Columbia |
| 2003/0025297 | A1 | 2/2003 | Brown et al. |

OTHER PUBLICATIONS

U.S. Patent Office, Final Office Action, U.S. Appl. No. 14/664,376, filed Mar. 20, 2015, dated October 7, 2015, 8 pages.
Amendment After Non-Final Rejection, for U.S. Appl. No. 14/664,376, filed Mar. 20, 2015, filed Sep. 21, 2015, 10 pages.

* cited by examiner

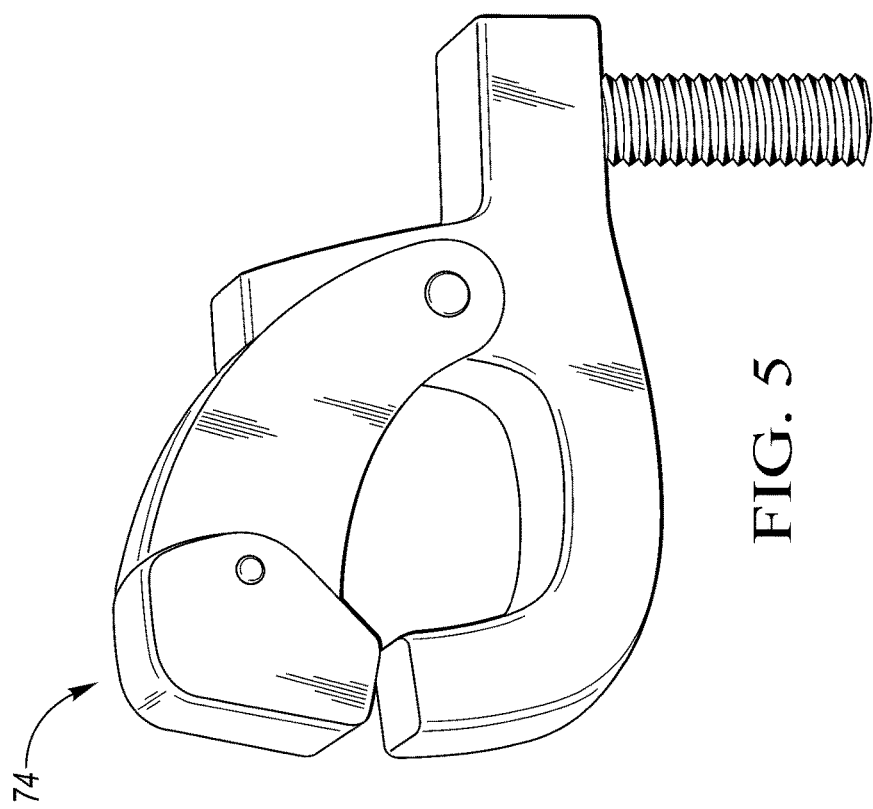
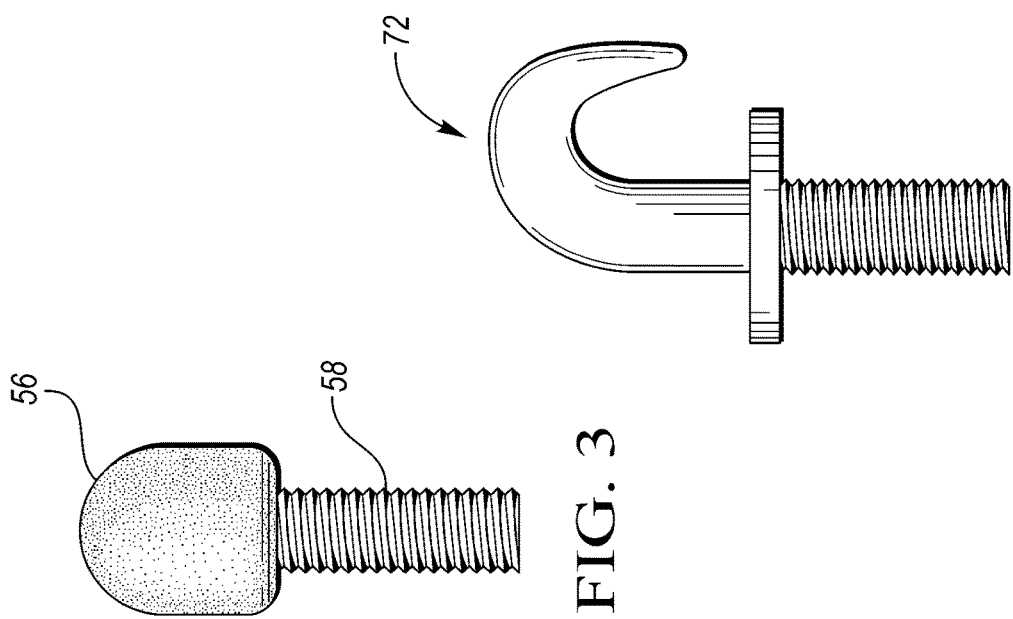
FIG. 5
FIG. 4
FIG. 3

REMOVABLE TRAILER TOW HITCH

CROSS-REFERENCE TO RELATED APPLICATIONS

The present application is the U.S. national phase of PCT Application No. PCT/US2015/021158 filed Mar. 18, 2015, which claims the benefit of U.S. provisional application Ser. No. 61/969,353 filed Mar. 24, 2014, the disclosure of which is hereby incorporated in its entirety by reference herein.

TECHNICAL FIELD

The present disclosure relates to a trailer tow hitch removably secured to a small vehicle, such as a golf cart.

BACKGROUND

It is common in some communities, such as retirement communities, for the primary mode of transportation to be vehicles smaller than automobiles, such as golf carts. Golf carts and other small vehicles have smaller cargo space than that of a typical automobile. Accordingly, devices have been proposed to increase the usable cargo space of golf carts and other small vehicles. On such proposal is a trailer tow hitch that is permanently secured to the golf cart. This proposal has certain drawbacks that have not been addressed by the existing devices.

SUMMARY

A removable trailer tow hitch is provided. The removable trailer tow hitch includes a tongue having a first clamping portion at a first end and a second end configured to receive a towing connection. The first clamping portion is configured to engage a vehicle bumper. A lever arm having a second clamping portion, configured to engage a vehicle frame, is pivotally attached to the tongue. The second clamping portion removably secures the trailer tow hitch to a vehicle when the lever arm is moved from an open position to a closed position.

A golf cart is provided. The golf cart includes a frame and a bumper secured to the frame. A tow hitch having a first clamping portion is configured to engage the bumper. A lever arm having a second clamping portion is pivotally affixed to the tow hitch and is configured to engage the frame. The tow hitch is secured to the golf cart when the first clamping portion engages the bumper and the lever arm transitions from an open position to a closed position such that the second clamping portion engages the frame.

A detachable tow hitch is provided. The detachable tow hitch includes a tongue having a towing connection at a first end and a first clamping portion at a second end. The first clamping portion is configured to engage a bumper. A lever arm, having a second clamping portion configured to engage a frame, is pivotally affixed to the tongue. The detachable tow hitch is secured to a vehicle when the first clamping portion engages the bumper and the lever arm transitions from an open position to a closed position such that the second clamping portion engages the frame.

BRIEF DESCRIPTION OF THE DRAWINGS

FIG. 3 illustrates an alternative embodiment of a clamping portion of the removable trailer tow hitch shown in FIG. 1;

FIG. 4 illustrates an alternative embodiment of a towing connection of the removable trailer tow hitch shown in FIG. 1;

FIG. 5 illustrates yet another alternative embodiment of the towing connection of the removable trailer tow hitch shown in FIG. 1;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It would be desirable and advantageous to increase the overall cargo space of a golf cart or other relatively small vehicle by removably connecting a trailer or wagon to the vehicle. In an illustrative embodiment, a removable trailer tow hitch is disclosed. The removable trailer tow hitch has a tongue with a first clamping portion located at one end, and the tongue is configured to receive a towing connection at the other end. The first clamping portion is configured to engage a vehicle bumper. A lever arm having a second clamping portion is pivotally attached to the tongue. The second clamping portion is configured to removably secure the trailer tow hitch to a vehicle when the lever arm is moved from an open position to a closed position. The second clamping portion is configured to engage a vehicle frame, such as a frame of a golf cart.

In one aspect, a locking mechanism is used to secure the lever arm in the closed position. The first end of the tongue may include a slot for receiving the lever arm. The first clamping portion may be C-shaped and configured to engage a top portion and two side portions of the vehicle bumper. The second clamping portion of the lever arm may include at least one contacting surface that is configured to engage the vehicle frame. The second clamping portion of the lever arm may be adjustable relative to the vehicle frame. The second end of the tongue may include an aperture that is configured to receive the towing connection. The towing connection may include a threaded portion that is configured to secure the towing connecting to the tongue with a bolt.

Figure 1:
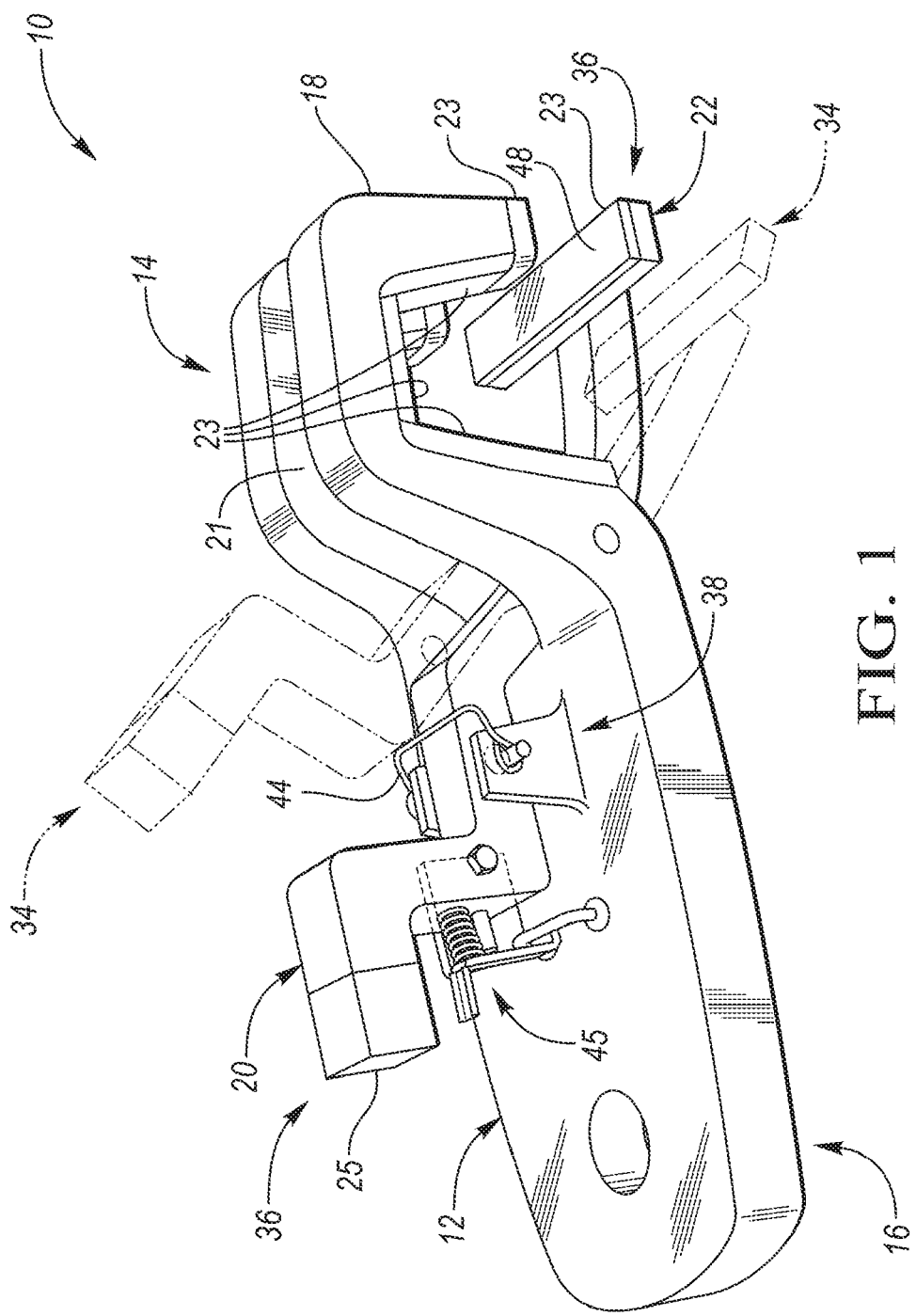
FIG. 1 is a perspective view of a removable trailer tow hitch illustrating an open position and a closed position of a lever arm having a clamping portion.
Figure 2:
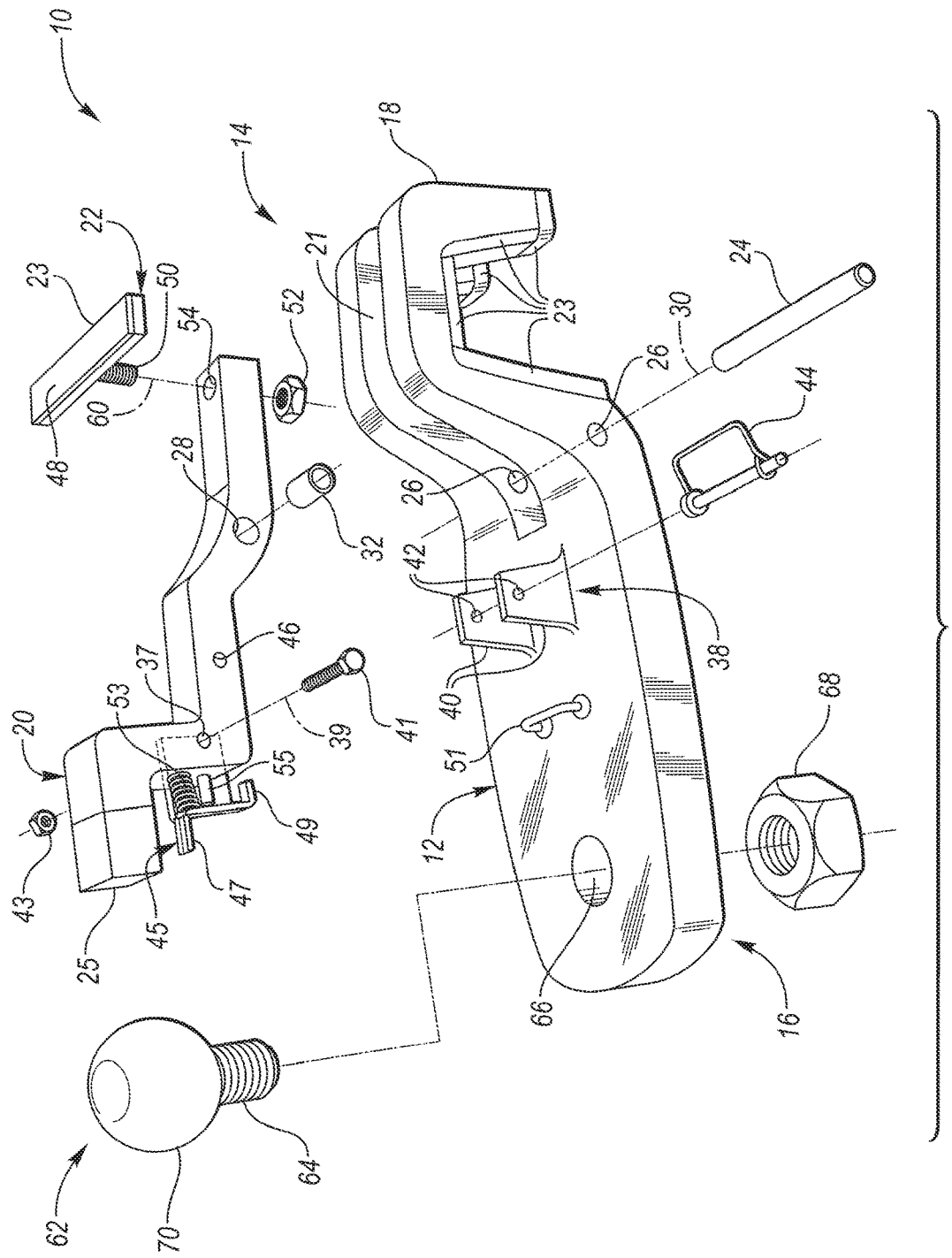
FIG. 2 is an exploded perspective view of the removable trailer tow hitch shown in FIG. 1.

FIGS. 1 and 2 illustrate a removable trailer tow hitch 10. The trailer tow hitch 10 includes a tongue 12 that has a first end 14 and a second end 16. The first end 14 includes a first clamping portion 18. The first clamping portion 18 may be C-shaped and configured to engage a top portion and two side portions of a vehicle bumper. Also included is a lever arm 20 having a second clamping portion 22 which is configured to engage a vehicle frame. The end of the lever arm 20 that is opposite of the clamping portion 22 may include a gripping portion 25. The gripping portion 25 is preferably made from a material that is suitable for allowing a user to grasp the lever arm 20, such as rubber or soft plastic materials. The first clamping portion 18 and the second clamping portion 22 may include engagement pads 23 that are configured to engage with the vehicle bumper and vehicle frame. The engagement pads 23 are preferably made from a rubber or soft plastic material that exhibits elastic and cushioning properties. The tongue 12 may include a slot 21 into which the lever arm 20 is received.

The lever arm 20 is pivotally attached to the tongue 12. As shown in FIG. 2, the attachment of the lever arm 20 to the tongue 12 may include a pin 24 that is inserted through a pair of apertures 26 in the tongue 12 and single aperture 28 that is located on the lever arm 20. The pin 24 may also be press fit into the pair apertures 26 in the tongue 12 to prevent the pin 24 from slipping along its longitudinal axis 30, and slip fit into the single aperture 28 in the lever arm 20 to allow lever arm 20 to pivot relative to the tongue 12. A bushing 32 may also be inserted into the single aperture 28 to decrease friction and wear of the moving parts. Alternatively, the pin 24 may be press fit into the single aperture 28 in the lever arm 20 to prevent the pin 24 from slipping along its longitudinal axis 30, and slip fit into the pair apertures 26 in the tongue 12 to allow lever arm 20 to pivot relative to the tongue 12. Also alternatively, a pair of bushings (not shown) may be inserted into each of the pair apertures 26 to decrease friction and wear of the moving parts. Although the pivotal attachment was described in terms of a pin and apertures, other pivotal attachments may be utilized to pivotally attach the lever arm 20 to the tongue 12.

The removable trailer tow hitch 10 may be secured to a vehicle when the lever arm 20 is moved from an open position 34 to a closed position 36. While in the closed position 36, the first clamping portion 18 engages a top portion and two side portions of a vehicle bumper, and the second clamping portion 22 engages a vehicle frame.

A locking mechanism 38 may be incorporated into the removable trailer tow hitch 10 to secure the lever arm 20 in the closed position 36. Securing the lever arm 20 in the closed position 36 prevents the trailer tow hitch from transitioning to the open position 34, which in turn ensures that the removable trailer tow hitch 10 will remain secured to the vehicle. In the illustrated embodiment, the locking mechanism 38 consists of a pair of tabs 40 that extend from the tongue 12, each tab 40 having an aperture 42. The locking mechanism also includes a locking pin with a retainer 44 that may be inserted into the apertures 42 in the pair of tabs 40 and an aperture 46 located in the lever arm 20 to secure the lever arm 20 in the closed position 36. A hitch pin coupled with a cotter pin, spring pin, R-clip, hairpin cotter pin, bridge pin, or spring cotter pin may be used in place of the locking pin with a retainer 44. Although the locking mechanism 38 was described as a locking pin with a retainer 44 that engages a series of apertures, other locking mechanisms 38 may be utilized to lock the lever arm 20 in the closed position 36, such as a clipping mechanism having a biasing element that retains the lever arm 20 in the closed position 36 or a ratcheting mechanism.

A second locking mechanism 45 may be pivotally connected to the lever arm 20. A threaded bolt 41 and a nut 43 may pass through aligned apertures 37 in the locking mechanism 45 and lever arm 20 to secure the second locking mechanism 45 to the lever arm 20. A washer (not shown) may be utilized in securing the nut 43 to the threaded bolt 41. The aligned apertures 37 may define an axis 39 in which the second locking mechanism 45 may pivot about. The second locking mechanism 45 may have a handle portion 47 and a latching portion 49 that is configured to engage a retaining portion 51 that is affixed to the tongue 12. The retaining portion 51 may consist of a loop or an eyelet. The second locking mechanism 45 may also include a biasing element 53, such as a spring, to bias the latching portion 49 so that it remains engaged with the retaining portion 51. The second locking mechanism 45 may also include a stop 55 that is configured to contact the lever arm 20 in order to prevent the second locking mechanism 45 from pivoting beyond a certain point.

The second clamping portion 22 of the lever arm 20 may be depicted having a contacting surface 48 and a threaded portion 50. The contacting surface 48 may be utilized for engaging vehicle frames or portions of vehicle frames that are made from materials having significant gaps in the material, such as extruded steel, extruded aluminum, extruded rigid plastics, or other extruded materials. The contacting surface 48 of the clamping portion 22 of the lever arm 20 may be covered with a layer of flexible material, such as rubber or soft plastic, for engaging the vehicle frame. The layer of flexible material may correspond to the engagement pads 23 previously referred to. The clamping portion 22 may be fixed to the lever arm 20 by securing a nut 52 to the threaded portion 50, once the threaded portion has been extending through an aperture 54 in the lever arm 20. A washer (not shown) may be utilized in securing the nut 52 to the threaded portion 50. The clamping portion 22 may be fixed to the lever arm 20 in some other manner, such as by a welding process.

Another embodiment of the second clamping portion 22 is illustrated in FIG. 3. In this embodiment, the clamping portion is depicted as a stopper 56 having a threaded portion 58. The stopper 56 may be utilized for engaging vehicle frames or portions of vehicle frames that are made from materials having substantially flat surface areas. The stopper may be made from a flexible material, such as rubber or soft plastic. The stopper 56 may be fixed to the lever arm 20 by securing the nut 52 to the threaded portion 58, once the threaded portion 58 has been extended through the aperture 54 in the lever arm 20. A washer (not shown) may be utilized in securing the nut 52 to the threaded portion 58.

Although both the embodiments of the clamping portion 22, either having the contacting surface 48 or the stopper 56, are shown as bolted to the lever arm 20, they may be permanently fixed to (by processes such as welding) or an integral part of the lever arm 20. In addition, the clamping portion 22, either having the contacting surface 48 or the stopper 56, may also be adjustable up and down along the longitudinal axis 60 defined by the aperture 54.

Referring again to FIG. 2, the second end 16 of the tongue 12 is configured to receive a towing connection 62. The towing connection 62 may include a threaded portion 64 that is received in an aperture 66 located in the second end 16 of the tongue 12. The towing connection 62 may be fixed to the tongue 12 by securing a nut 68 to the threaded portion 64, once the threaded portion 64 has been extended through the aperture 66 in the tongue 12. A washer (not shown) may be utilized in securing the nut 68 to the tongue 12.

Alternative forms of coupling the towing connecting 62 to the tongue 12 are included in one or more embodiments. For example, the towing connection 62 may be welded to the tongue 12. As another example, the towing connection 62 may include threaded portions that are fed through a plurality of apertures located on the tongue 12, which is then secured in position by a plurality of bolts. Furthermore, the tongue 12 may have one or more threaded studs that are that are fed through apertures located on the towing connecting 62 or apertures located on a metal plate that is connected to the towing connection 62, which is then secured in position by one or more bolts.

The towing connecting 62 may be a tow ball 70 as depicted in FIG. 2, which is configured to receive a tow ball coupler which typically is a ball socket. In the alternative, the towing connecting may also be a tow hook 72 as depicted in FIG. 4, which is configured to receive an eyebolt, lunette ring, or some other form of eye coupler; or a pintle hook 74 as depicted in FIG. 5, which is also configured to receive an eyebolt, lunette ring, or some other form of eye coupler. The type of towing connection should not be construed as limited to the types towing connection listed herein and should be construed to cover all types of towing connections such as a shackle that engages an eyebolt.

Figure 6:
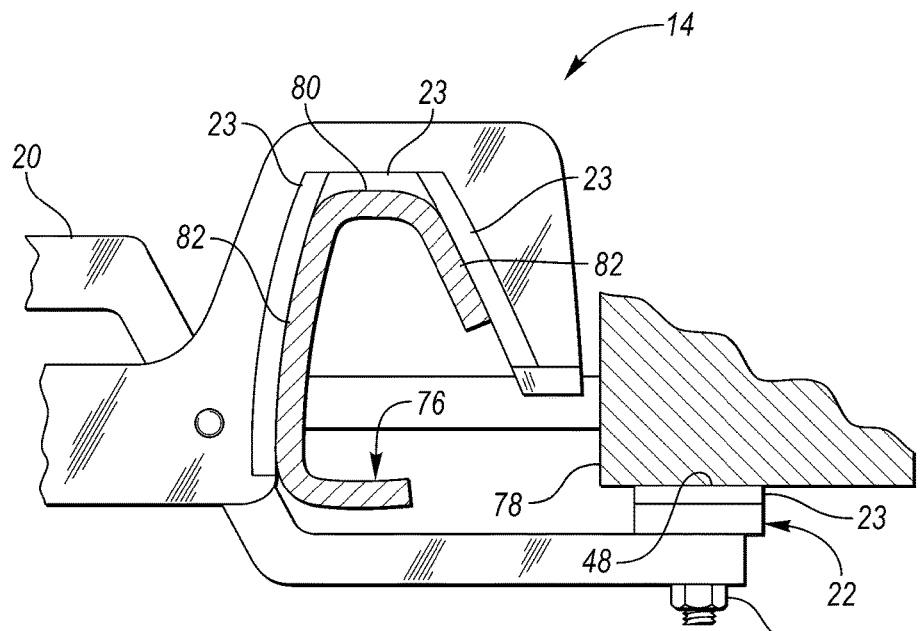
FIG. 6 illustrates the removable trailer tow hitch in the closed position when attached to a bumper and frame of a vehicle.

FIG. 6 illustrates how the first end 14 of the vehicle trailer tow hitch 10 attaches to a vehicle. The first clamping portion 18 is secured to a vehicle bumper 76 and the second clamping portion 22 is secured to a vehicle frame 78, when the trailer tow hitch is in the closed position. The vehicle bumper 76 may have a top portion 80 and side portions 82. Although the second clamping portion 22 is depicted as having a contacting surface 48 for engaging the vehicle frame 78 in FIG. 6, it should be understood that the alternative embodiment having a stopper 56 (depicted in FIG. 3) may be substituted for the second clamping portion 22 having the contacting surface 48. Cross sections of the vehicle bumper 76 and vehicle frame 78 are depicted in FIG. 6 to clarify how the trailer tow hitch 10 attaches to the vehicle by eliminating unnecessary details.

Figure 7:
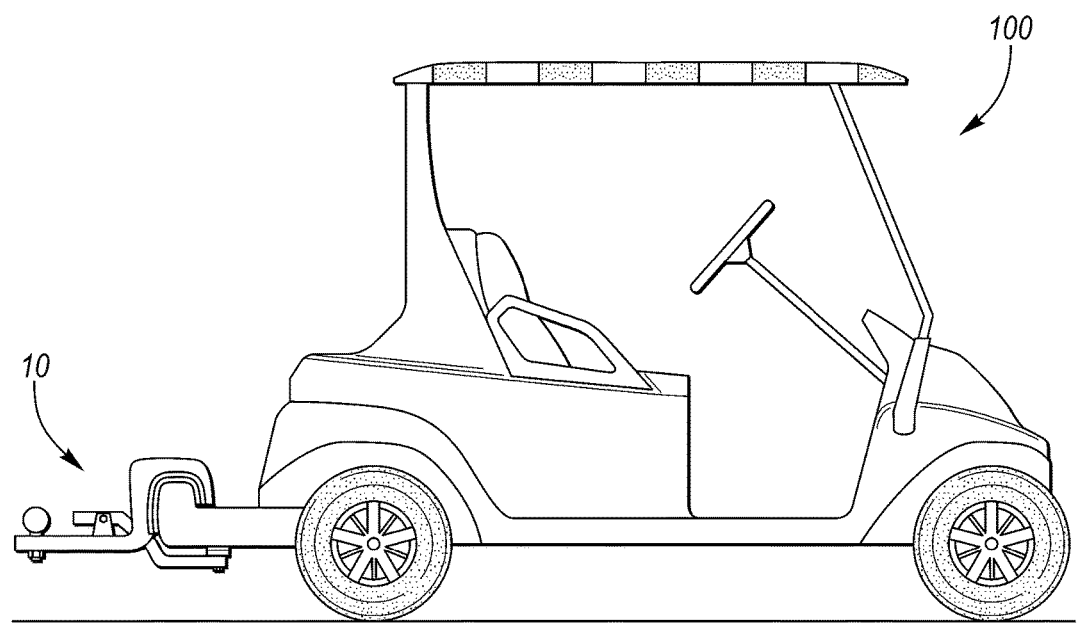
FIG. 7 illustrates the removable trailer tow hitch attached to a golf cart.

FIG. 7 illustrates the removable trailer tow hitch 10 when attached to a golf cart 100. The first clamping portion and the second clamping portion are shown engaging the frame and bumper of golf cart in order to secure the trailer tow hitch to the golf cart, as described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A removable trailer tow hitch comprising:
   a tongue having a first clamping portion at a first end and a second end configured to receive a towing connection, the first clamping portion configured to engage a vehicle bumper;
   a lever arm having a second clamping portion and a gripping portion located on opposing sides of the lever arm relative to a pivot pin extending through the lever arm, the gripping portion being positioned further than the second clamping portion from the pivot pin, the lever arm pivotally attached to the tongue via the pivot pin, wherein the second clamping portion removably secures the trailer tow hitch to a vehicle when the lever arm is moved from an open position to a closed position, the second clamping portion configured to engage a vehicle frame; and
   a locking mechanism secured to the lever arm proximate to the gripping portion on the opposing side of the pivot pin relative to the second clamping portion, the locking mechanism having a latch that is configured to engage a retaining portion that is affixed to the tongue such that the lever arm is secured in the closed position when the latch engages the retaining portion.

2. The removable trailer tow hitch of claim 1, wherein the first end of the tongue includes a slot for receiving the lever arm.

3. The removable trailer tow hitch of claim 1, wherein the first clamping portion is C-shaped, and includes a horizontally oriented elastic pad configured to engage a top portion of the bumper and a pair of elastic pads configured to engage side portions of the bumper.

4. The removable trailer tow hitch of claim 1, wherein the second clamping portion includes a horizontally oriented elastic pad that is configured to engage the vehicle frame.

5. The removable trailer tow hitch of claim 1, wherein the second clamping portion is adjustable relative to the vehicle frame.

6. The removable trailer tow hitch of claim 1, wherein the second end of the tongue includes an aperture that is configured to receive the towing connection.

7. The removable trailer tow hitch of claim 1, wherein the locking mechanism is pivotally secured to the lever arm such that the latch is configured to rotate about the pivot to engage and disengage the retaining portion.

8. The removable trailer tow hitch of claim 1, wherein the locking mechanism includes a biasing element configured to maintain engagement between the latch and the retaining portion.

9. The removable trailer tow hitch of claim 1, wherein an end of the lever arm, opposite of the clamping portion, includes a rubber grip.

10. A golf cart comprising:
    a frame;
    a bumper secured to the frame;
    a tow hitch having a first clamping portion configured to engage the bumper, and a tongue portion, adjacent to the first clamping portion, configured to receive a towing connection;
    a lever arm pivotally affixed to the tow hitch, the lever arm having a second clamping portion configured to engage the frame; and
    a locking mechanism secured to the lever arm and having a latch that is configured to engage an eyelet that is affixed to the tongue portion such that lever arm is secured in a closed position when the latch engages the eyelet,
    wherein the tow hitch is secured to the golf cart when the first clamping portion engages the bumper and the lever arm transitions from an open position to the closed position such that the second clamping portion engages the frame.

11. The golf cart of claim 10, wherein the tongue includes an aperture that is configured to receive the towing connection.

12. The golf cart of claim 10, wherein the tow hitch includes a slot for receiving the lever arm.

13. The golf cart of claim 10, wherein the first clamping portion is C-shaped, and includes a horizontally oriented elastic pad configured to engage a top portion of the bumper and a pair of elastic pads configured to engage side portions of the bumper.

14. The golf cart of claim 10, wherein the second clamping portion includes a horizontally oriented elastic pad that is configured to engage the vehicle frame.

15. A detachable tow hitch comprising:
    a tongue having a towing connection at a first end and a first clamping portion at a second end, the first clamping portion configured to engage a bumper; and a lever arm pivotally affixed to the tongue, the lever arm having a second clamping portion configured to engage a frame; and a locking mechanism configured to secure the lever arm to the tongue such that lever arm is in a closed position when secured to the tongue, wherein the detachable tow hitch is secured to a vehicle when the first clamping portion engages the bumper and the lever arm transitions from an open position to the closed position such that the second clamping portion engages the frame.

16. The detachable tow hitch of claim 15, wherein the first clamping portion is C-shaped and is configured to engage a top portion and side portions of the bumper.

17. The detachable tow hitch of claim 15, wherein the tongue includes a slot for receiving the lever arm.

18. The detachable tow hitch of claim 15, wherein the locking mechanism includes a latch that is configured to engage an eyelet that is affixed to the tongue to secure the lever arm to the tongue.

19. The detachable tow hitch of claim 15, wherein the lever arm defines a first aperture, the tongue includes at least one tab defining a second aperture, and the locking mechanism includes a locking pin that is configured to engage the first and second apertures to secure the lever arm to the tongue.

20. The detachable tow hitch of claim 15, wherein an end of the lever arm, opposite of the clamping portion, includes a rubber grip.

* * * * *